(12) United States Patent
Feindler et al.

(10) Patent No.: US 11,990,275 B2
(45) Date of Patent: May 21, 2024

(54) ELECTROMAGNETIC ACTUATOR DEVICE AND USE OF SUCH A DEVICE

(71) Applicant: ETO Magnetic GmbH, Stockach (DE)

(72) Inventors: Michael Feindler, Stockach (DE); Marcin Nieweglowski, Wroclaw (PL)

(73) Assignee: ETO Magnetic GmbH, Stockach (DE)

( * ) Notice: Subject to any disclaimer, the term of this patent is extended or adjusted under 35 U.S.C. 154(b) by 338 days.

(21) Appl. No.: 16/756,906

(22) PCT Filed: Sep. 13, 2018

(86) PCT No.: PCT/EP2018/074696
§ 371 (c)(1),
(2) Date: Apr. 17, 2020

(87) PCT Pub. No.: WO2019/076549
PCT Pub. Date: Apr. 25, 2019

(65) Prior Publication Data
US 2021/0202146 A1 Jul. 1, 2021

(30) Foreign Application Priority Data
Oct. 19, 2017 (DE) ...................... 10 2017 124 485.9

(51) Int. Cl.
*F16K 31/06* (2006.01)
*H01F 7/16* (2006.01)
*F16K 11/07* (2006.01)

(52) U.S. Cl.
CPC ....... *H01F 7/1607* (2013.01); *F16K 31/0675* (2013.01); *F16K 31/0693* (2013.01);
(Continued)

(58) Field of Classification Search
CPC ............. F16K 31/0603; F16K 31/0675; F16K 31/0693; H01F 7/1607; H01F 2007/1661
See application file for complete search history.

(56) References Cited

U.S. PATENT DOCUMENTS

| 5,402,093 A * | 3/1995 | Gibas | H01F 7/081 |
| | | | 335/262 |
| 8,641,011 B2 * | 2/2014 | Scherer | H01F 7/1607 |
| | | | 251/129.21 |

(Continued)

FOREIGN PATENT DOCUMENTS

| CN | 102741600 A | 10/2012 |
| CN | 104769271 A | 7/2015 |

(Continued)

OTHER PUBLICATIONS

International search report for patent application No. PCT/EP2018/074696 dated Feb. 20, 2019.

*Primary Examiner* — Matthew W Jellett
(74) *Attorney, Agent, or Firm* — Bachman & LaPointe, P.C.

(57) ABSTRACT

An electromagnetic actuator includes an armature (18) movable axially relative to a stationary core (14) as a reaction to energizing of a stationary coil (12) in an actuator housing (10). The armature (18) is gripped by an axially extended slide (20) guided in a core passage (50) of the core such that a movement of the armature in the direction of the core entrains the slide. An end section (26) of the slide, axially opposite the armature, cooperates with an adjusting partner, the slide having a long rod section (34) and a disk-type end section (30) with a widened diameter on the rod section, on the end in the direction of the armature (18), the axial extension (W) of the end section determining a minimum distance between the armature and the core in an abutment state of the armature on an end surface and/or front surface of the core, facing the armature.

16 Claims, 2 Drawing Sheets

(52) U.S. Cl.
CPC ....... *F16K 11/0716* (2013.01); *F16K 31/0603* (2013.01); *H01F 2007/1661* (2013.01)

(56) References Cited

U.S. PATENT DOCUMENTS

| | | | |
|---|---|---|---|
| 8,757,585 B2* | 6/2014 | Bill ...................... | H01F 7/1607 |
| | | | 335/297 |
| 9,127,780 B2* | 9/2015 | Schnelker ............ | F16K 31/0658 |
| 10,082,218 B2* | 9/2018 | Klenk ...................... | F16K 7/14 |
| 11,015,730 B2* | 5/2021 | Kasagi .................... | F16K 11/07 |
| 2007/0017587 A1* | 1/2007 | Groschel ................. | F16K 31/06 |
| | | | 137/625.65 |
| 2008/0315140 A1* | 12/2008 | Hamaoka ............... | F01L 1/3442 |
| | | | 251/129.15 |
| 2009/0026399 A1* | 1/2009 | Ishibashi ............. | F16K 31/0613 |
| | | | 251/129.15 |
| 2009/0120412 A1* | 5/2009 | Tokuo .................. | F02M 59/102 |
| | | | 123/506 |
| 2011/0049405 A1* | 3/2011 | Bill ...................... | H01F 7/1607 |
| | | | 251/129.15 |
| 2013/0248743 A1* | 9/2013 | Kasagi ............... | F16K 31/0613 |
| | | | 251/129.15 |

FOREIGN PATENT DOCUMENTS

| | | | |
|---|---|---|---|
| CN | 105830179 | A | 8/2016 |
| CN | 106051259 | A | 10/2016 |
| DE | 102011052526 | A1 | 2/2013 |
| DE | 102013114830 | A1 | 6/2015 |
| DE | 102014113500 | A1 | 3/2016 |
| DE | 102016109865 | A1 | 11/2017 |
| WO | 2011015418 | A1 | 2/2011 |
| WO | 2014006056 | A1 | 1/2014 |

\* cited by examiner

ELECTROMAGNETIC ACTUATOR DEVICE AND USE OF SUCH A DEVICE

BACKGROUND OF THE INVENTION

The present invention relates to an electromagnetic actuator device. Furthermore, the present invention relates to a use of such an electromagnetic actuator device as a valve device.

Electromagnetic actuators are known from the state of the art in which an armature unit which, as a reaction to stationary coil means being energized, is movable relative to stationary core means and drives a valve slide unit and, corresponding to a respective position, causes a valve functionality. Not least because of the simple constructive realization, the large-scale manufacturability and the mechanical reliability, generic actuator devices according to the preamble, in particular in an embodiment as or for valve devices, can be used for a wide range of applications. Said devices are preferably used in connection with the fluid circuit or a camshaft actuation in a vehicle or in an automotive context, but the use is not limited to said technical field.

FIG. 8 for explaining the background of the invention is based on DE 10 2016 109 865 (not disclosed at the date of filing of the present application) and shows an electromagnetic actuator device in a housing 10 on the left side of the figure, said electromagnetic actuator device having the features disclosed herein: Opposite to stationary coil means 12 and stationary core means 14, 16 which are partially surrounded by coil means 12, an armature unit (armature means) 18 is movable along an axial direction (corresponding to the horizontal in the drawing layer of FIG. 8) as a reaction to coil assembly 12 being energized. Armature unit 18 interacts with an elongated plunger unit (plunger means) 20 in a frictional manner, in such a manner that an armature movement to the right in the drawing layer along arrow direction 24 is realized during the energization starting from the de-energized abutment position away from core means 40 (prestressed by resetting spring means 22), an end section 26 (engagement section) of moved plunger 20 thus moving a valve slide 28 which opens or closes valve fluid connections P, A and T as intended—in the specific example, this is realized in the form of a proportional valve. In the shown illustration of the state of the art according to FIG. 8, housing 10 is composed of two parts (and optionally separable), namely a housing part on the left side which is assigned to the actual actuator assemblies and a housing part on the right side which is assigned to the valve assemblies.

Such a device can be used for a plurality of control and actuation functions, for example as a camshaft control valve at an internal combustion engine which is used in an automotive context. As well as a work or engagement area which is axially adjacent to end section 26 of plunger means 20, the armature space, i.e. the chamber which is axially limited between armature 18 and sleeve-like core 14 surrounded by coil means 12 and whose size can be varied corresponding to the state of movement of the armature means, is filled with a lubricant, typically oil. With respect to the realization or dimensioning and the operation of such a device, in particular fluid-dynamic effects, influenced by said lubricant, must be taken into account in addition to electromagnetic effects, an effective (fluid) pressure equalization being required in order to avoid dynamism disadvantages in switching operation—concerning said switching operation, switching times, namely movement times for moving the armature along a maximum stroke may be critical.

A relative positioning and alignment of armature means 18 and core means 14 is also important for such a time response of the shown actuator device, not only in the (de-energized) initial state shown in FIG. 8, but also in an abutment state of armature body 18 at core 14. In order to ensure a smooth detachment of the armature from the core during a retransfer (after energizing the coil), the state of the art generally provides to realize a minimum distance between the armature and the core in the form of so-called anti-adhesive disks: said anti-adhesive disks are typically disk-shaped bodies made of a (magnetically non-conductive) metal material, such as stainless steel, which is applied (or loosely held) to one of the opposite front surfaces of the armature or of the core, for example by caulking, welding or bonding, a minimum distance between the armature and the core thus being defined in the extended or abutment state of the armature.

SUMMARY OF THE INVENTION

Against the background of said requirements for a smooth and reliable control operation of the generic electromagnetic actuator device, a substantial constructive effort is required, in particular, as known from generic devices, if the plunger unit which interacts with the armature means receives an inserted aforementioned anti-adhesive disk on the end side. In conjunction with the operations which cause a pressure equalization, a complex functional unit having a demanding manufacturing expenditure and quality control is realized.

Thus, the object of the present invention is to improve an electromagnetic actuator device with respect to a facilitated manufacturability and therefore an increased (and potentially automatable) suitability for large-scale production, to improve the actuator device with respect to its magnetic and its dynamic features and to realize a device which, in conjunction with valve assemblies, allows for the realization of a reliable electromagnetic valve, but which is also suitable for additional control or actuator applications.

Said object is attained by the electromagnetic actuator device having the features disclosed herein. Advantageous embodiments of the invention are disclosed herein and in the dependent claims. Furthermore, protection is sought within the scope of the invention for a use of such an electromagnetic actuator device according to the invention as a proportional valve device and/or as a camshaft control valve, in particular for an internal combustion engine.

In an advantageous embodiment of the invention, the functionality of the (magnetic) anti-adhesive disk is realized as a section of the plunger means for determining the minimum distance of the abutment between the armature means and the core means, more precisely as a disk-shaped end section of the plunger means which has a widened diameter and which sits in one piece on an elongated rod section of the plunger means. By this means, said plunger unit can be produced by means of a (single or common) manufacturing step using a suitable manufacturing or production method and the manufacturing expenditure is thus reduced, in particular regarding a suitability for large-scale production.

In particular if the plunger means are made of a polymer material—preferably by means of injection molding or similar automatable manufacturing—the cost-efficient manufacturability is optimized (the invention taking advantage of the fact that in the technological context of the plunger means which are guided through the core passage and which are provided so as to be separated or separable from the armature means, the plunger means are not involved in a force-exerting magnetic flux circuit and can therefore be made of injectable plastic material). The glass fibers (or similar blending), which are preferably added in an embodiment, improve the strength or stiffness properties of the produced plunger unit (plunger means) for a respective use.

The realization of the plunger means according to the invention, preferably in one piece, improved by the injection molding in an embodiment, allows in a simple manner to provide the rod section of the plunger means with a continuous recess in such a manner that a pressure equalization can be realized on both sides of the core means—said recess is preferably realized as a (suitably continuous) longitudinal groove which can be directly formed in a manner known per se by means of the tool used for the injection molding and without an additional processing step.

The same applies to the profiling (to be provided in an additional embodiment or as an alternative) of the end surface or front surface of the disk-shaped end section of the plunger means, said end surface or front surface being directed at the core means: In particular with respect to an (exclusively) plane realization of the front surfaces which are disposed on top of one another and which contact one another at the abutment of the armature, there is the risk of undesired (hydrostatic) adhesive effects due to the (lubricant) medium located in the armature space, for example an oil which is present in said armature space. The embodiment according to the invention in the form of a profiling effectively prevents the undesired adhering of the plunger means to the facing end surface of the core due to the aforementioned effects—in an additional preferred embodiment within the scope of the invention, said profiling is realized as (at least one) groove which preferably extends across the front surface of the end section (and therefore perpendicular to the axial direction).

In a preferred embodiment within the scope of the invention, in particular in a preferred realization according to the embodiment of the plunger means produced in one piece by the injection molding of a polymer material, said embodiment can be realized within the scope of the injection tool which is used for the injection molding and the requirement of an additional processing step for realizing an advantageous profiling is avoided.

The same applies for the plunger passage which is additionally provided according to the embodiment (and which can be provided in any combination with the embodiments discussed above) and which can open the armature passage to the armature space (between the armature means and the core means), in particular if an axial bore of the armature means is available; in other words, the fluid or pressure equalization can be realized along or through the armature means.

In order to realize the sitting on or (frictional) interaction between the plunger means and the armature means in a beneficial manner, in particular if the discussed armature passage is axially realized in the armature means, an additional advantageous embodiment within the scope of the invention provides to realize the disk-shaped end section in the form of an (entirely or partially) circumferential annular step in such a manner that the sitting on and transport is optimized in the interaction between the armature means and the plunger means. Additionally, such an annular step, in synergistic interaction with the plunger passage (discussed above) according to the embodiment, has the advantage that said plunger passage can be inserted into the plunger means or their disk-shaped end section outside a covering by the armature passage (armature bore). As well as the plunger passage, the annular step can also be formed in one piece and the tool which is used for the injection molding according to an advantageous embodiment can be directly used for realizing said advantageous embodiment.

In an additional advantageous embodiment according to the invention, the rod section is provided with circumferential guide surfaces (in sections in the axial direction) which are formed in one piece and which project in the radial direction on the sleeve side and which function as sliding surfaces in the form of preferably circumferential annular surfaces (interrupted by the longitudinal groove according to the embodiment, if applicable) for interacting with a corresponding inner or guide surface (preferably realized in a hollow-cylindrical manner) of the core passage. By realizing said surfaces in a suitable manner with respect to size, disposition and distribution, the movement or sliding behavior of the plunger means inside the core means can be influenced in a simple manner, said advantageous embodiment being also realizable within the scope of the one-piece injection molding, as described above, and no additional processing step being required if the tool which is used for the advantageous plastic injection is used.

Although the present invention can realize any control tasks, the actuator device according to the invention is preferably used as a control unit for a (proportional) valve, the end section of the plunger means according to the invention interacting with a valve slide as a control partner in this case. In a preferred embodiment according to the invention and by analogy with FIG. 8, a return spring is assigned to said control partner as an energy store in such a manner that the armature movement acts against the resetting force of said return spring when it is energized, said return spring resetting the armature means via the functional chain valve slide—plunger means—armature means. Said construction allows for the realization of a proportional valve in a beneficial manner, said proportional valve being claimed as the preferred, but not exclusive use of the present invention.

Overall, the present invention realizes the improvement of known and generic electromagnetic valve devices in a surprisingly simple and elegant manner, in particular for valve purposes with respect to improved operating characteristics, also relating to a simplified and therefore potentially large-scale manufacturability. The advantageous valve and/or control context, more preferably for the automotive scope of application is preferred, but it does not limit the technical range of uses for realizing the advantages of the present invention.

BRIEF DESCRIPTION OF THE DRAWINGS

Further advantages, features and details of the invention can be derived from the following description of preferred exemplary embodiments and from the drawings.

In the following.

DETAILED DESCRIPTION

Figure 1:
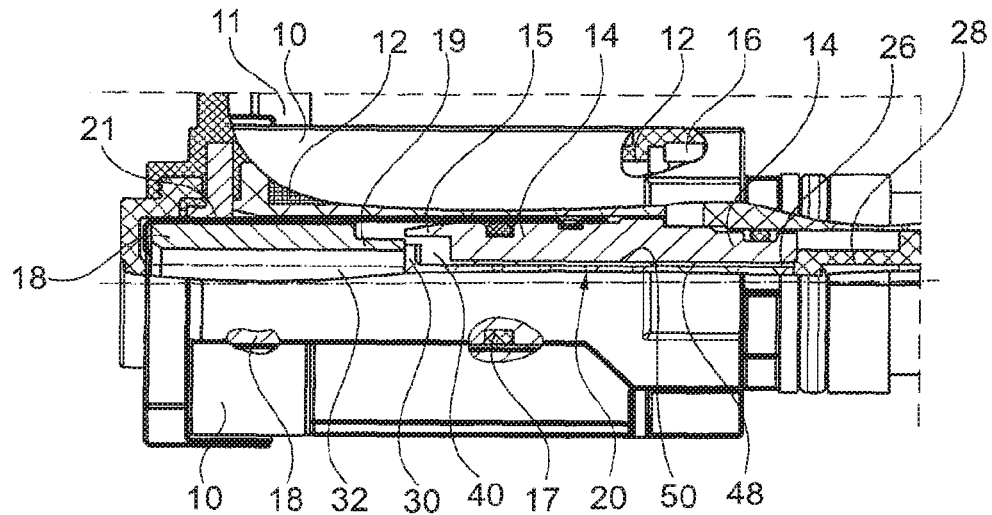
FIG. 1 is a partially sectional lateral view of the electromagnetic actuator device according to a first exemplary embodiment of the invention.
Figure 8:
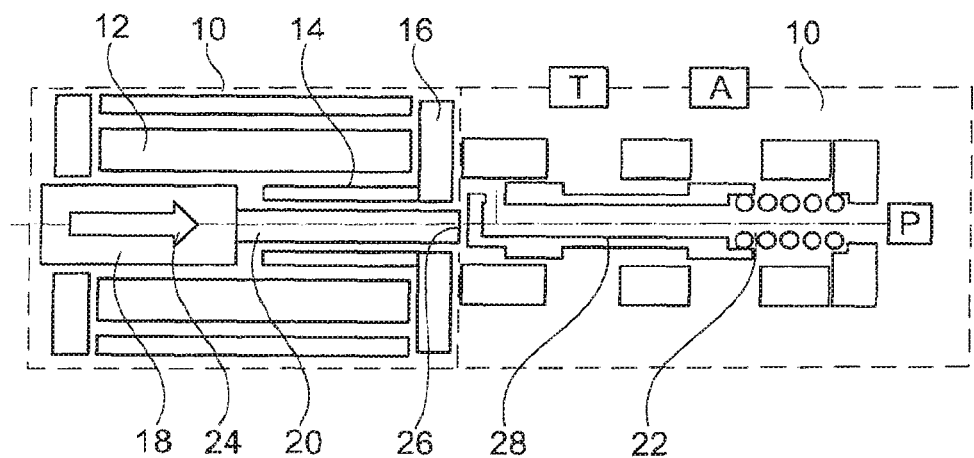
FIG. 8 is a longitudinal sectional, schematic view for clarifying a generic electromagnetic actuator device as background of the invention.

In the partially sectional view of FIG. 1, functionally equivalent assemblies compared to those of FIG. 8 are referenced with the same reference signs; a winding 12 on a coil support acts as a (stationary) coil mean comprising a hollow-cylindrical or sleeve-like stationary core 14 which interacts with an armature body 18 along the axial direction (horizontal in the drawing layer of FIG. 1), a conus section 15 of the core interacting with an armature projection 19 (in a manner known per se and for realizing a magnetic force-air gap) on the side of the armature. The disposition of core assembly 14 and armature assembly 18 is surrounded by an armature guide tube 21 (typically made of a non-magnetic steel material) which is directly located in the coil support of coil means 12. Coil means 12 are located in a substantially cylindrical housing shell 10, a plug section 11 being led out said housing shell 10 for an external energization of coil 12. Reference sign 17 refers to a seal 17 which supports (and seals) core unit (core means) 14 in armature guide tube 21.

A front surface on the end side of an end section 26 of plunger means 20 grips an assigned front surface on the engagement side of a valve slide unit 28 (as a control partner) axially opposite armature 18, a widened end section 30 of the plunger means sitting on end section 19 on the core side of armature means 18 on the other end. Said means have an armature bore 32 as an armature passage which extends through the armature means in the axial direction, disk-shaped end section 30 extending to an opening of said bore 32 when it contacts the armature means (shown in FIG. 1).

Plunger assembly 20 (plunger means) of the shown exemplary embodiment is produced by means of injection molding from a glass fiber reinforced (GF) polyamide material—PPS having 40 wt.-% GF in the present case. More precisely, plunger assembly 20 which is realized in one piece is composed of disk-shaped end section 30 (realized for a detachable sitting on core assembly 18) which passes to a rod section 34. Said rod section 34 has a pair of opposite longitudinal grooves 36, 38 which extend along a sleeve side in the axial direction and which connect an armature space 40 which is limited between core means 14 and armature means 18 (and which can be adjusted according to the armature position) in a pressure-equalizing manner to an engagement area on the right side of end section 26 (in the direction of valve slide 28).

It is shown how the effective (axial) width w (FIG. 4) of disk 30, in the form of an anti-adhesive disk, defines a minimum distance between armature 18 and core 14, a reliable fall and retransfer of the armature unit into the initial position of FIG. 1 thus being ensured when the energization of coil 12 is stopped (this is made possible by a return spring (not shown) by analogy with pressure spring 22 in FIG. 8 which engages at valve slide 28 as a control partner).

Additionally and preferably, disk-shaped end section 30 of plunger means 20 has means for avoiding a sticking (hydrostatic, because of an oil film or the like) of unit 20 to core 14 in the form of a pair of parallel longitudinal grooves 22, 44 (which extend perpendicular to the axial direction); in particular shown grooves 42, 44 reduce such an undesired adhesive effect in an advantageous manner and facilitate the detachment of the plunger means from the core when it is retransferred.

Additionally and preferably, rod section 34 of plunger means 20 has a pair of circumferential areal annular projections 46, 48 which are formed in one piece and which—as radial projections—allows for sliding surfaces for guiding plunger means 20 in hollow-cylindrical inner bore 50 of the core means (core passage).

Figure 2:
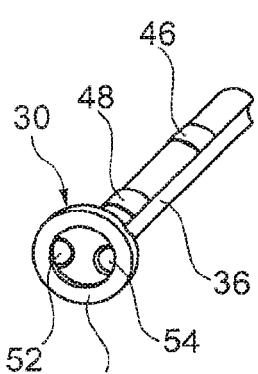
FIG. 2 to FIG. 7 are different views of the plunger means used within the scope of the actuator device of FIG. 1
Figure 3:
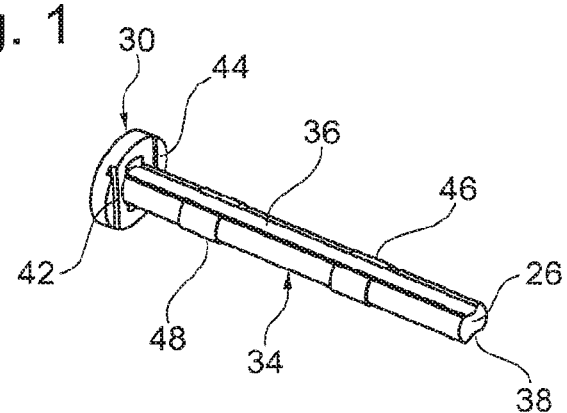
Figures 4, 5, 7:
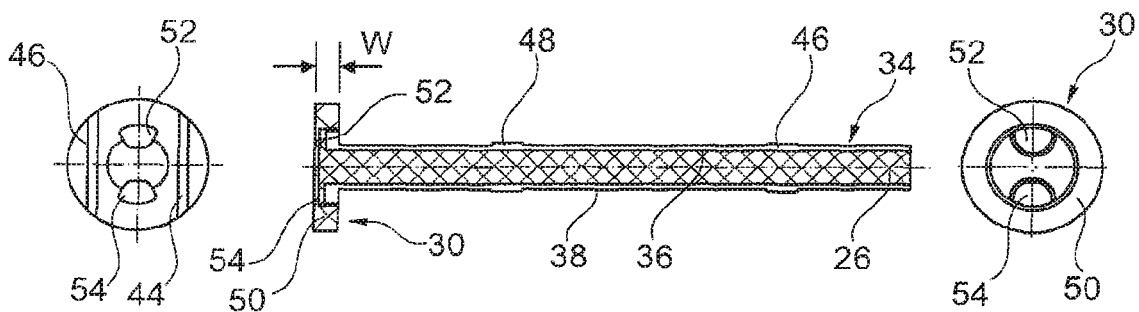
Figure 6:
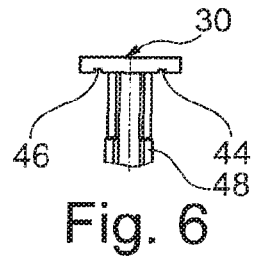

Furthermore, the end surface of disk-shaped end section 30 which is directed at armature means 18 is provided with a circumferential annular step 50, in particular shown in FIG. 2 and FIG. 7, end section 30 thus sitting on the outer edge on the front side of armature means 18 and realizing a step, said outer edge being realized by end section 19, and end section 30 opening or releasing armature bore 32 to armature space 50 via a pair of passages 52, 54 which is realized in end section 30—in a corresponding manner, a pressure equalization can be realized which extends to the end (on the left side in FIG. 1) of armature means 18 in armature guide tube 21.

If an injection tool for the production of plunger means 20 is realized in a suitable manner, all the abovementioned embodiments, grooves, projections and passages can be manufactured using a single manufacturing step—the injection molding—, in particular without the need for additional manufacturing steps for realizing individual functional sections. Accordingly, plunger assembly 20 is suitable for combining a cost-efficient production and large-scale manufacturability with a wide range of applications (also within the scope of configurable modular systems or the like).

The invention claimed is:

1. An electromagnetic actuator device having armature means (18) which, as a reaction to stationary coil means (12) being energized, is movable in an actuator housing (10) along an axial direction relative to stationary core means (14), and which contact axially elongated plunger means (20) guided in a core passage (50) of the core means (14) in such a manner that a movement of the armature means (18) in the direction of the core means (14) can entrain the plunger means (20), an end section (26) of the plunger means (20), axially opposite the armature means (18), being realized for interacting with or realizing a control partner, wherein the plunger means comprise an elongated rod section (34) and a disk-shaped end section (30) having a widened diameter and the disk-shaped end section (30) sitting on the elongated rod section as one piece on an end side in the direction of the armature means (18), an axial extension (W) of the disk-shaped end section (30) determining a minimum distance between the armature means and the core means in an abutment state of the armature means on an end surface and/or front surface of the core means facing the armature means, wherein the plunger means (20) are made of a polymer material using an injection molding process, wherein the elongated rod section (34) has a recess facing the core means, the recess being realized as a longitudinal groove (36, 38) in such a manner that a pressure equalization can be realized between an armature space (40) which is defined by the armature means (18) and the core means (14), and an engagement area axially spaced beyond the end section (26) of the plunger means (20), wherein the armature means have an armature passage (32) which extends in the axial direction and the plunger means are realized for overlapping, at least in sections, an opening on the plunger side of the armature passage (32) in the area of the disk-shaped end section, wherein the plunger means have a plunger passage (52, 54) through the disk-shaped end section (30), in such a manner that the plunger passage (52, 54) opens the armature passage (32) towards the armature space (40) between the armature means and the core means while equalizing the medium pressure when the armature means are contacted by the plunger means, and wherein the disk-shaped end section has an annular step (50) defined by substantially parallel axially spaced circumferential surfaces, and wherein the annular step extends around a full circumference of the disk-shaped end section.

2. The device according to claim 1, wherein the disk-shaped end section has a profiling (42, 44) on a flat side, said profiling being provided for interacting with the end surface or the front surface of the core means.

3. The device according to claim 2, wherein the profiling is realized as at least one groove (42, 44).

4. The device according to claim 1, wherein the rod section (34) has a circumferential guide surface (46, 48) formed in one piece in sections in the axial direction for the sliding interaction with a guide inner surface of the core passage (50), said guide surface (46, 48) projecting in the radial direction on the sleeve side.

5. The device according to claim 1, wherein energy storing means are assigned in a frictional manner to the armature means and/or to the plunger means in such a manner that said energy storing means pre-stress the armature means in an axial abutment position away from the core means in the valve housing.

6. A use of the electromagnetic actuator device according to claim 1 as a proportional valve device and/or as a camshaft control valve for an internal combustion engine.

7. The device according to claim 1, wherein the control partner is a valve slide (28).

8. The device according to claim 1, wherein the end section is in the form of a magnetic anti-adhesive disk.

9. The device according to claim 1, wherein the polymer material has a glass fiber blending.

10. The device according to claim 1, wherein the longitudinal groove (36, 38) is continuous in the axial direction.

11. The device according to claim 3, wherein the at least one groove (42, 44) extends perpendicularly to the axial direction in the flat side.

12. The device according to claim 1, wherein the armature passage (32) is in an axial central bore.

13. The device according to claim 1, wherein the plunger passage (52, 54) is a bore.

14. The device according to claim 5, wherein the energy storing means is in the form of spring means.

15. The device according to claim 1, wherein the disk-shaped end section (30) defines a full circular radially outer circumference, and wherein the plunger passage (52, 54) passes through the disk-shaped end section (30) within radially inward from the full circular radially outer circumference.

16. An electromagnetic actuator device, comprising:
armature means (18);
an actuator housing (10);
stationary core means (14) axially fixed relative to the actuator housing (10), the armature means (18) being movable in the actuator housing (10) along an axial direction relative to the stationary core means (14) as a reaction to stationary coil means (12) being energized;

axially elongated plunger means (20) guided in a core passage (50) of the core means (14) and contacting the armature means (18) such that movement of the armature means (18) in the direction of the core means (14) entrains the plunger means (20), wherein the plunger means (20) has an end section (26) axially opposite the armature means (18), the end section (26) being configured to interact with a control partner, wherein the plunger means (20) further comprise an elongated rod section (34) and a disk-shaped end section (30) having a widened diameter, the disk-shaped end section (30) sitting on the elongated rod section (34) as one piece on an end of the plunger means (20) facing the armature means (18), wherein an axial extension (W) of the disk-shaped end section (30) determines a minimum distance between the armature means (18) and the core means (14) in an abutment state of the armature means (18) on an end surface and/or front surface of the core means (14) facing the armature means (18), wherein the plunger means (20) are made of a polymer material, wherein the elongated rod section (34) has a recess facing the core means (14), the recess comprising a longitudinal groove (36, 38) extending along the elongated rod section (34) such that pressure is equalized between an armature space (40) which is defined by the armature means (18) and the core means (14), and an engagement area axially spaced beyond the end section (26) of the plunger means (20), wherein the armature means (18) have an armature passage (32) which extends in the axial direction, and wherein the plunger means (20) overlaps, at least in sections, an opening on a plunger side of the armature passage (32) in an area of the disk-shaped end section (30), wherein the plunger means (20) have a plunger passage (52, 54) extending axially through the disk-shaped end section (30) such that the plunger passage (52, 54) opens the armature passage (32) towards the armature space (40) between the armature means (18) and the core means (14) while equalizing the pressure when the armature means (18) are contacted by the plunger means (20), and wherein the disk-shaped end section has an annular step (50) defined by substantially parallel axially spaced circumferential surfaces, and wherein the annular step extends around a full circumference of the disk-shaped end section.

* * * * *